United States Patent
Boonen et al.

(10) Patent No.: US 6,577,698 B1
(45) Date of Patent: Jun. 10, 2003

(54) INSTALLATION FOR LOADING FUEL RODS INTO A NUCLEAR FUEL ASSEMBLY

(75) Inventors: Franciscus Boonen, Kasterlee (BE); Stijn Thijs, Neerpelt (BE); Claude Roth, Donzere (FR); Claude Fichet, Romans (FR)

(73) Assignee: Societe Franco-Belge de Fabrication de Combusstible FBFC, Courbevoie (FR)

( * ) Notice: Subject to any disclaimer, the term of this patent is extended or adjusted under 35 U.S.C. 154(b) by 0 days.

(21) Appl. No.: 09/868,872

(22) PCT Filed: Dec. 20, 1999

(86) PCT No.: PCT/FR99/03202

§ 371 (c)(1), (2), (4) Date: Sep. 27, 2001

(87) PCT Pub. No.: WO00/38195

PCT Pub. Date: Jun. 29, 2000

(30) Foreign Application Priority Data

Dec. 22, 1998 (FR) .......................................... 98 16218

(51) Int. Cl.$^7$ ............................................ G21C 3/334
(52) U.S. Cl. ................................................... 376/261
(58) Field of Search ....................... 376/261, 268–274; G21C 19/19, 3/334

(56) References Cited

U.S. PATENT DOCUMENTS

| 4,747,997 | A | * | 5/1988 | Boatwright | 29/244 |
|---|---|---|---|---|---|
| 4,760,637 | A | * | 8/1988 | Kerrey et al. | 29/241 |
| 5,043,133 | A | * | 8/1991 | Lambert et al. | 376/261 |
| 5,251,243 | A | * | 10/1993 | Nylund et al. | 29/723 |
| 5,274,684 | A | * | 12/1993 | Yoshida et al. | 376/261 |
| 5,301,214 | A | * | 4/1994 | Kato et al. | 376/261 |
| 5,317,609 | A | * | 5/1994 | Fichet et al. | 376/261 |
| 5,319,684 | A | * | 6/1994 | Koiwai et al. | 376/261 |
| 5,323,432 | A | * | 6/1994 | Ohuchi et al. | 376/261 |
| 5,699,393 | A | * | 12/1997 | Picard et al. | 376/261 |
| 5,881,119 | A | * | 3/1999 | Evans et al. | 376/261 |
| 6,157,034 | A | * | 12/2000 | Griebel et al. | 250/358.1 |

FOREIGN PATENT DOCUMENTS

FR  2 709 202  12/1997

* cited by examiner

Primary Examiner—Michael J. Carone
Assistant Examiner—Daniel Matz
(74) Attorney, Agent, or Firm—Kenyon & Kenyon

(57) ABSTRACT

The installation is designed for loading a nuclear fuel assembly that comprises a skeleton structure defining parallel locations for receiving fuel rods distributed in sheets. The installation comprises a horizontal bench (22) for receiving a skeleton structure, a magazine (16) for receiving rods for loading in a disposition that corresponds to that of the rods in the assembly, and a pulling bench (26) having a block of pulling or pushing elements enabling a plurality of rods to be slid simultaneously from the magazine into the skeleton structure. The bench makes it possible for a set of clamps from a plurality of sets each corresponding to a particular type of assembly to be fixed removably thereto by quick coupling and uncoupling means closed by actuators. The pulling bench (26) receives one out of a plurality of pulling element selector blocks, each block having a disposition of active pulling elements corresponding to a particular distribution of rods.

12 Claims, 4 Drawing Sheets

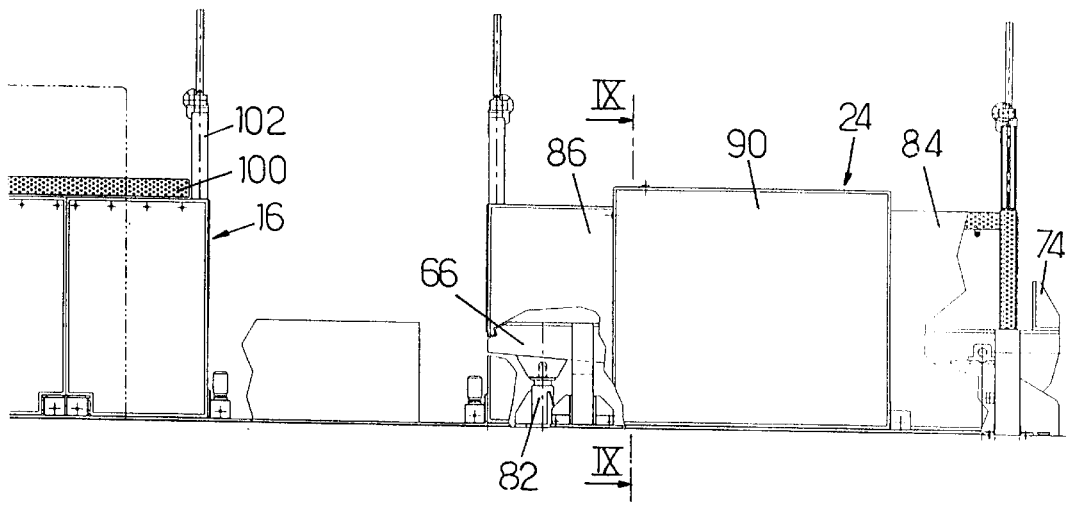
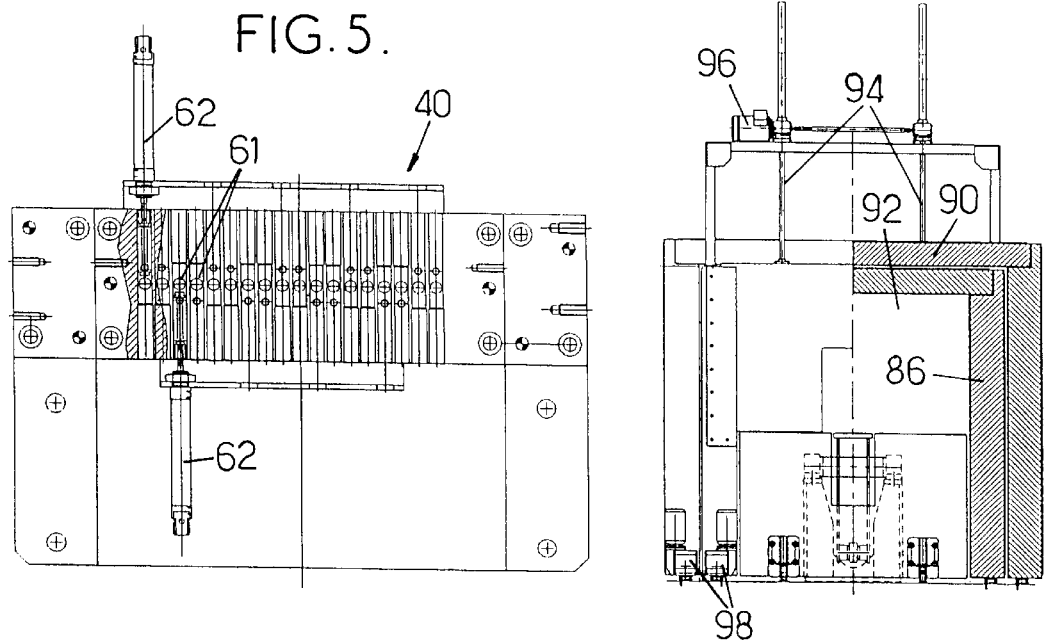

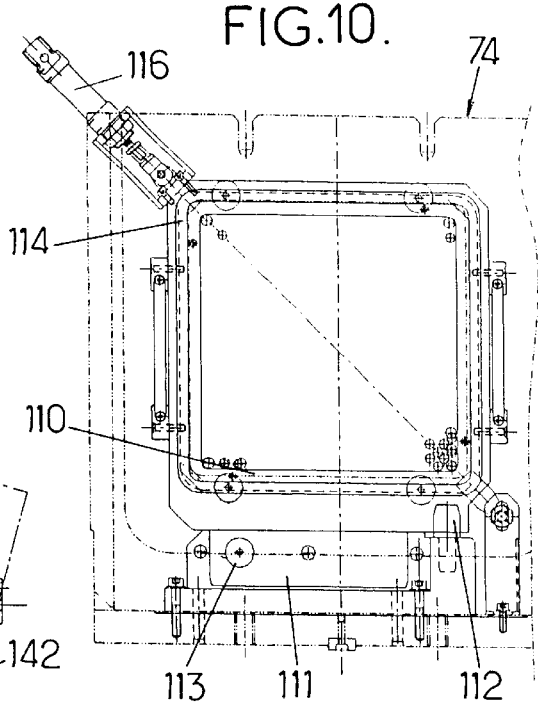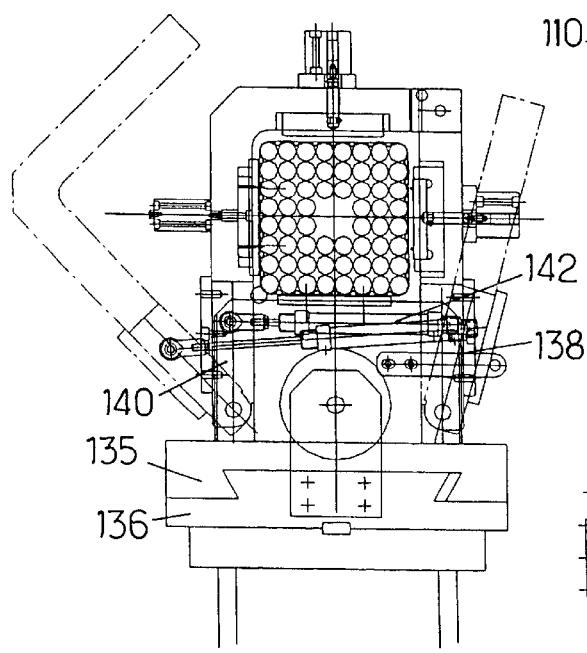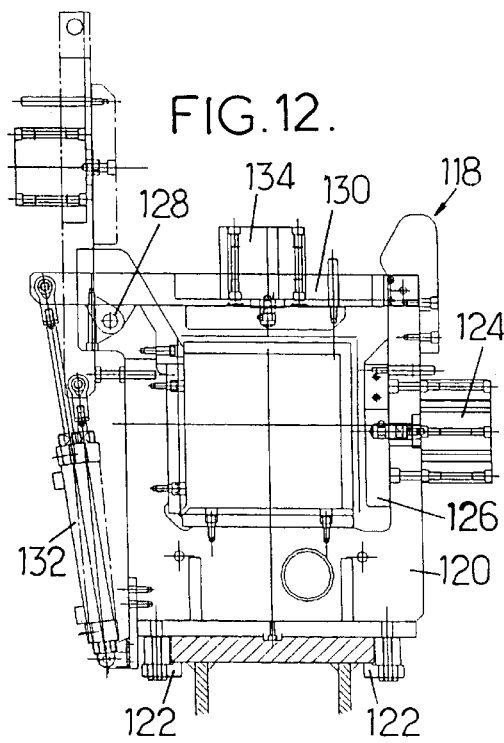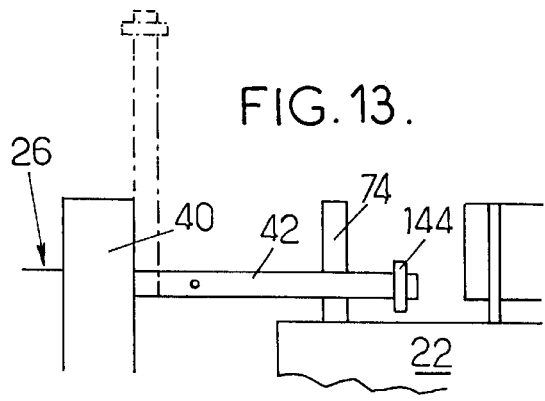

INSTALLATION FOR LOADING FUEL RODS INTO A NUCLEAR FUEL ASSEMBLY

The present invention relates to loading installations for making up nuclear fuel assemblies for inserting fuel rods into a skeleton structure.

Existing assemblies are of structures that are very different from one another. The assemblies used in pressurized water reactors generally comprise a skeleton made up of guide tubes connecting a bottom nozzle to a top nozzle and carrying grids for holding fuel rods in a regular array. Fuel assemblies for boiling water reactors have a variety of structures. Frequently, they comprise a skeleton structure having a central tube interconnecting two nozzles and carrying grids that are mounted to "float" to a small extent on the central tube in the longitudinal direction. In other cases, the skeleton structure comprises a plurality of longitudinal structural tubes interconnecting two nozzles and each allocated to a substantially square virtual sector occupied by a bundle of fuel rods. Yet other assemblies are of hexagonal section.

Numerous installations are already known for loading nuclear fuel assemblies and that have a skeleton structure defining parallel fuel rod receiving locations arranged in sheets. Such an installation comprises:

- a rigid structure for receiving a skeleton structure in a horizontal position;
- a magazine for receiving rods to be loaded, placed in a disposition corresponding to the disposition of the rods in the assembly to be loaded; and
- a bench for pulling or pushing rods, generally sheet by sheet, from the magazine to the receiving skeleton structure.

An installation of that kind as described in document FR-A-2 709 202 enables rods to be loaded into the skeleton of a fuel assembly for a pressurized water reactor. That installation gives satisfactory results, but it requires major modifications and a considerable down time of the installation when it is desired to switch from loading assemblies of a given type to loading assemblies having rods in a different distribution, for example at a pitch which is different and/or with rods and guide tubes in a different distribution in the array.

The above drawback is shared with all other presently-existing loading installations.

The present invention seeks in particular to provide an installation making it possible to make up successive fuel assembly batches for light water nuclear reactors with short periods of installation down time whenever it is desired to switch from manufacturing one type of assembly to manufacturing some other type, thus providing a high degree of flexibility in use.

To this end, the invention provides an installation for making up a nuclear fuel assembly, the installation comprising:

- a rigid structure for receiving a skeleton in a horizontal position;
- a magazine for receiving rods for loading in a disposition that corresponds to that of the rods in the assembly; and
- a bench for pulling or pushing rods comprising a block of pulling or pushing elements enabling a plurality of rods to be slid simultaneously from the magazine into the inside of the skeleton structure; the installation being characterized in that the pulling bench is designed to receive a block for selecting pull or push elements from a plurality of blocks, each block activating only those pull or push elements that correspond to a particular set of guide plates, and in that the reception structure includes a bench enabling a set of clamps selected from a plurality of sets each corresponding to a particular type of assembly to be secured removably by quick coupling and uncoupling means closed by actuators. The reception magazine generally comprises a housing provided with grooves for receiving any one of a plurality of sets of guide plates, each set corresponding to a particular array that reproduces the array intended for the assembly. Nevertheless, it is also possible to provide a particular type of magazine for each type of assembly.

By replacing only a few components, it is possible to adapt the machine to different rod distribution pitches, to different numbers of rods in an array, and/or to a different distribution of empty locations in an array.

It is becoming more and more commonplace to use fuel assemblies in which at least some of the rods contain not only uranium oxide, but also plutonium oxide and even possibly oxides of other transuranium elements. Such fuel rods have much higher gamma and neutron activity than do new rods containing uranium oxide only.

To reduce the risk of operators being exposed to radiation, the invention optionally proposes an installation in which the reception magazine carried by a support carriage is covered by a biological protection hood of U-shaped cross section bearing against the top face of the carriage. The rigid reception structure of the skeleton structure of the assembly can also be designed to receive a biological protection hood, often implemented in the form of a plurality of parts can be removed separately. As a result, any interventions that turn out to be necessary need only give rise to a small exposure dose.

To further reduce the need for intervention by an operator, the entire operating sequence can be controlled by a central programmed computer and control member capable of having a plurality of programs loaded therein, each corresponding to a different type of assembly. Another solution consists in providing actuators such as electrical or pneumatic actuators that are remotely controlled.

In both cases, the presence of an operator close to the installation is required only for performing the modifications that are necessary for switching from one type of manufacture to another. These operations can be performed when the installation does not contain any nuclear fuel.

The above characteristics and others will appear more clearly on reading the following description of a particular embodiment of the invention that is given by way of non-limiting example. The description refers to the accompanying drawings, in which:

FIG. 5 is a front view of a removable draw bar selection block for fixing to the pulling bench;

FIG. 8 is a cutaway diagrammatic elevation view for showing biological protection that can be used with the rocking bench;

FIG. 9 is a view of the biological protection seen from the left of FIG. 8, and shown partially in section on line IX—IX of FIG. 8;

FIG. 10 is an elevation view showing a magazine having inserts for placing on the upending bench, between the full bench and the skeleton structure which is to receive the rods;

FIG. 11 is a view from the left of FIG. 6 showing the grids for defining the rod array of an assembly for a boiling water nuclear reactor (BWR) and clamps enabling them to be locked in place;

FIG. 12 is similar to FIG. 11 and shows a grid and a clamp for loading an assembly for a pressurized water reactor (PWR); and FIG. 13 is a diagrammatic elevation view showing a removable arm usable for verifying that rods have not been pulled too far.

The installation described below is of general structure comparable to that disclosed in U.S. Pat. No. 5,317,609 to which reference can be made. Consequently, the description below relates essentially to those elements of the installation which are original.

The complete installation can be constituted by apparatuses arranged in a hall provided with handling means, for example winches carried by a monorail. The installation includes means for feeding empty skeleton structures (not shown) and also means for feeding vessels containing rods to be loaded. These vessels are provided with biological protection when the rods they transport are radioactive, as applies in particular for so-called "MOX" rods containing pellets of uranium and plutonium oxide. Rods are transferred from a "waterfall" carriage to follow a sinuous path therein, one after another. The waterfall carriage makes it possible to bring rods into rod-receiving magazines in a disposition corresponding to that of the rods in an assembly for loading. The order in which rods are fed to the waterfall carriage can be arranged so that the reception magazine receives rods of different kinds depending on their final locations in the assembly.

Figure 1:
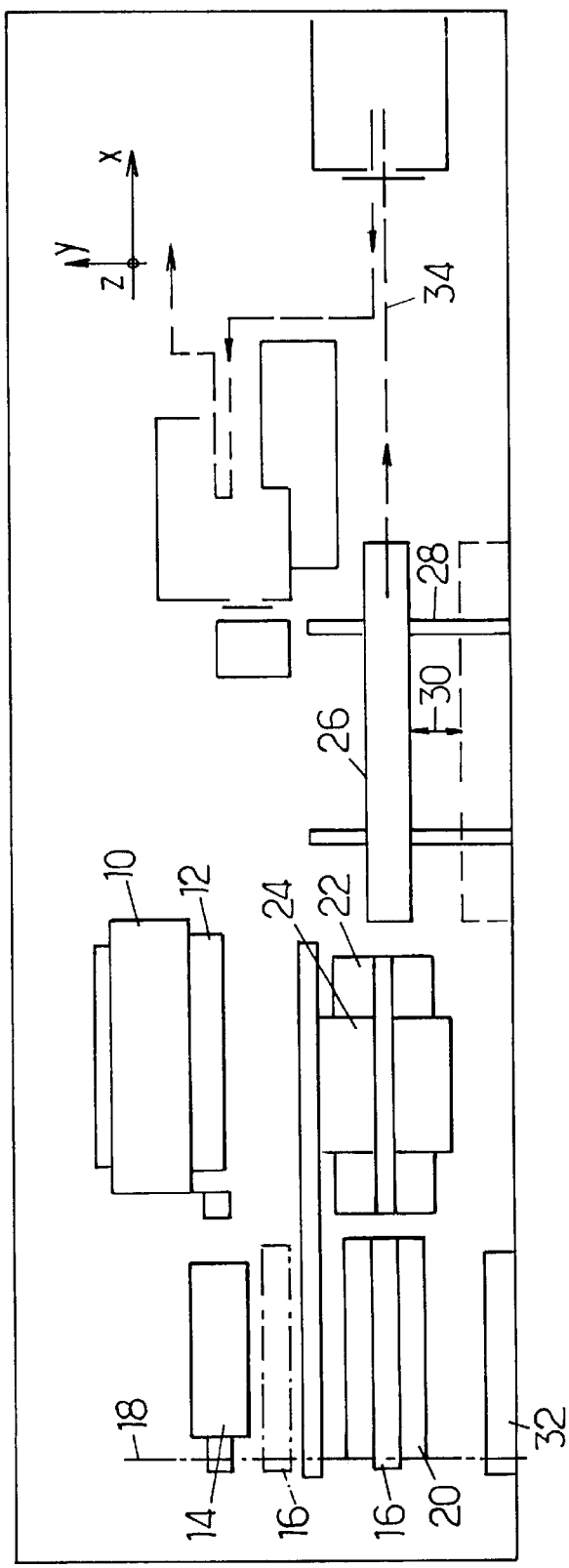
FIG. 1 is a diagrammatic plan view showing how devices in a loading installation are distributed from fuel rod feed to assembly delivery.
Figure 2:
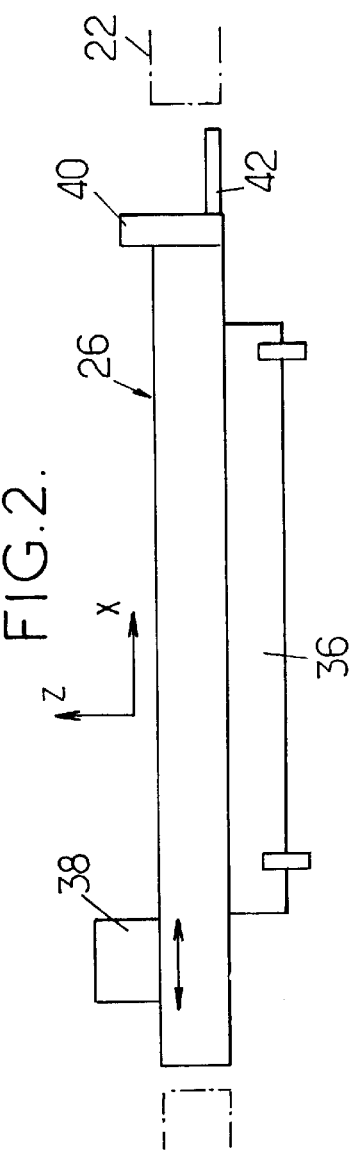
FIG. 2 is a diagrammatic elevation view of a pulling bench forming part of the FIG. 1 installation.
Figure 3:
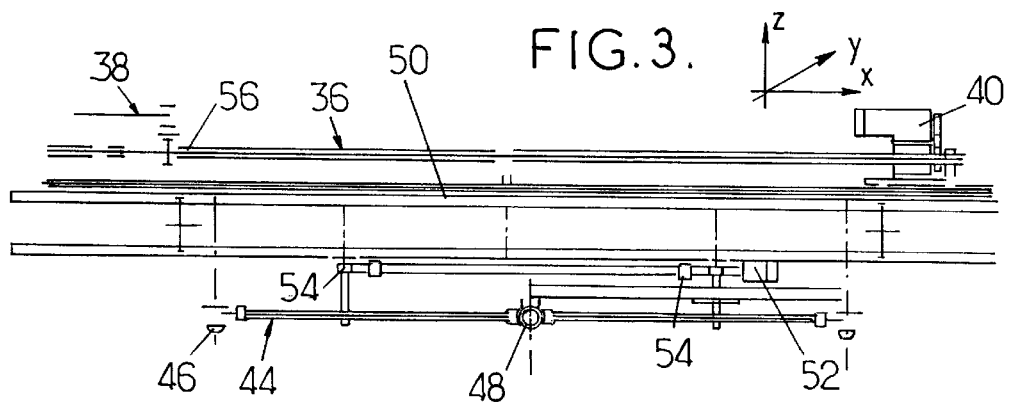
FIG. 3 is an elevation view of a frame of the FIG. 2 pulling bench.

FIG. 1 shows the position of the waterfall carriage 10 fitted with biological shielding when it is for receiving MOX rods, beside an inlet table 12 which is separated by a cleaning location from an indexing machine 14 of a reception magazine filled with rods coming from the carriage 10. In an advantageous embodiment, the magazine comprises an elongate receptacle in which a plurality of sets of pairs of grooves are formed. Each set is for receiving a particular set of perforated plates corresponding to a determined array of rods in the assembly for loading.

An overhead crane that moves in direction 18 serves to bring the magazines 16 into the position shown by chain-dotted lines, on a support 20.

The installation also has a rigid structure for receiving each skeleton structure in turn, which structure is constituted by a swingable bench 22 designed to receive biological protection 24 when the installation handles rods containing MOX fuel. The bench can be stationary or it can be mounted on rails enabling it to be brought into alignment with the reception magazine 16 and with a pulling bench 26 which is movable transversely on rails 28 enabling it to be brought into the position shown in dashed lines by being moved along double-headed arrow 30.

The skeleton structures for loading can be brought onto the rocking bench 22 by means of a carriage 32.

Finally, additional zones enable the usual operations of inspection and cleaning to be performed on complete assemblies, which the crane means can transport in a vertical position in the direction shown by dashed-line arrows 34.

The essential apparatuses of the installation are described below in succession.

Pulling Bench (FIGS. 2 to 5)

The pulling bench 26 is for inserting rods into successive sheets into the skeleton structure of an assembly while the skeleton structure is supported horizontally.

The bench can be regarded as comprising a frame 36, a carriage 38 that is movable along the frame, and a removable block 40 for selecting pulling elements. This block is selected from a plurality of blocks corresponding to different distributions of rods in an assembly. The bench 26 can also have removable safety arms 42 whose function is described below.

The frame 36 includes a cradle 44 that is movable in the y direction by a motor 48 driving toothed wheels. The pulling bench can thus be taken from the working position in which it is shown in continuous lines in FIG. 1 to the rest position shown in dashed lines. On the cradle, there is mounted a beam 50 carrying the carriage. A motor 52 actuating actuators 54 serves to move the beam 50 vertically (z direction) to adjust the height of the pulling elements 56 (which are constituted by bars) so as to bring them level with each sheet of rods to be loaded.

The carriage 38 is mounted on the beam 50 via bearings enabling it to move along the bench (x direction). These movements are driven by rotating a drive screw 58, itself driven by a motor.

Pulling elements carried by the carriage are distributed to occupy a complete horizontal sheet. To enable the invention to be implemented, the pulling elements are connected to the carriage 38 by connection means which:

in the pulling direction, i.e. when the carriage is tending to pull the rods from the magazine towards a structure, serve to provide a positive connection, via a mechanical abutment; and in the pushing direction, serve to perform resilient locking only, e.g. by means of a spring biased ball engaging into a recess in the pulling element.

For safety reasons, a force sensor can be mounted between the pulling elements and the mechanical abutment of the positive connection, so as to measure the pulling force.

Figure 4:
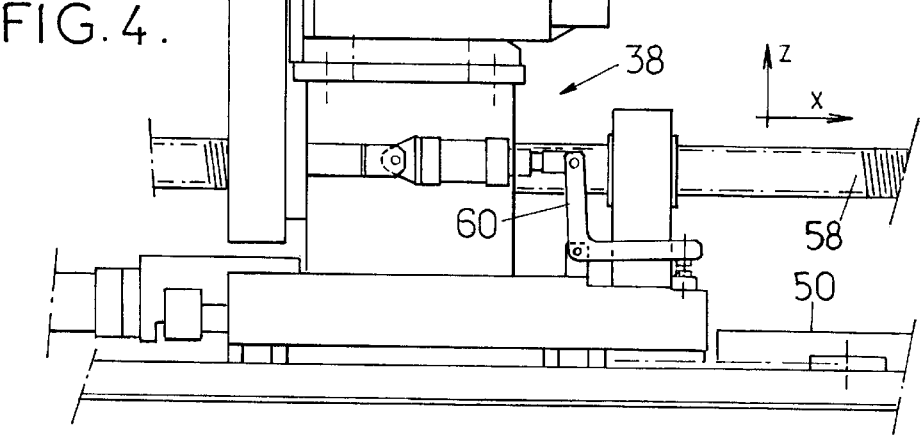
FIG. 4 is an elevation view showing the carriage of the FIG. 2 pulling bench.

In addition, the carriage is provided with a mechanism enabling the end clamp of the pulling elements to be opened and closed. FIG. 4 shows only one bell crank 60 of this transmission mechanism, which can be conventional. The clamps can be opened and closed by a mechanism similar to that described in above-mentioned U.S. Pat. No. 5,317,609.

The block 40 for selecting pulling elements (FIG. 5) has a row of through holes in the same disposition as the pulling elements. Each hole in the selection block is provided with a retractable cover 61 preventing the corresponding pulling element from advancing when it is placed facing the hole by a pneumatic actuator such as 62. When the carriage moves towards the magazine containing rods in order to take hold of the rods, those elements which are in register with a cover become temporarily separated from the carriage and stop moving.

This disposition is simple to implement when all of the assemblies to be loaded have the same rod distribution pitch, even if the rods are replaced by other elements at different locations.

If, on the contrary, provision is made for loading assemblies having pitches that are very different, it can be necessary either to provide a plurality of different connection means, at appropriate pitches, or else to ensure that the pulling elements are very flexible.

Figure 6:
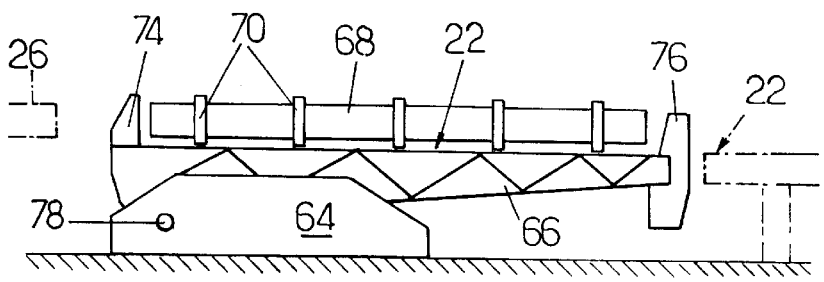
FIG. 6 is an elevation view showing a rigid structure for receiving an assembly skeleton structure, the structure being constituted by a upending bench.
Figure 7:
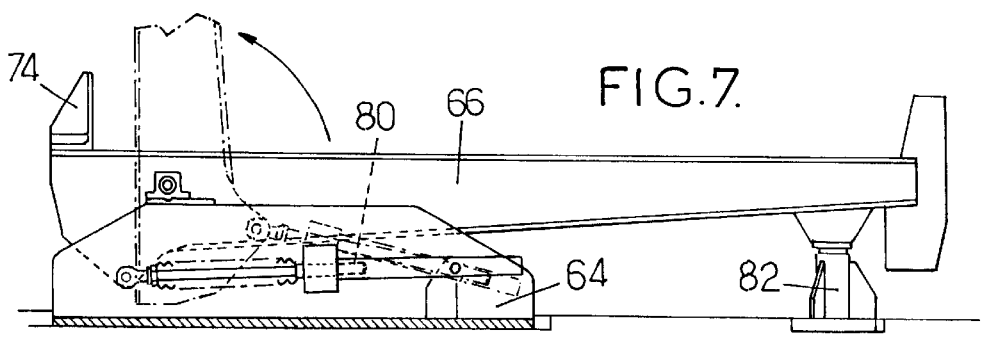
FIG. 7 is an elevation view showing the beam of the upending bench of FIG. 2, together with its upending mechanism.

Rocking Bench (FIGS. 6 and 7)

The rocking bench 22 holds the skeleton structure of the assembly for loading while the rods are being inserted, and optionally while the bottom and top nozzles are being mounted and guide tubes are fixed in the nozzles. It also serves to swing a loaded assembly from the horizontal position to the vertical position so as to enable it to be taken and transported without deforming by handling means such as an overhead crane.

The rocking bench 22 can be regarded as comprising a frame 64 and an upending beam 66. The beam is designed to receive the skeleton structure 68 of the assembly for loading, represented in FIG. 6 by the grids 70 and the virtual envelope or outline 72 of the pull bars of a PWR assembly. The beam also carries an insert magazine 74 and a system 76 for extracting inserts. They can be of relatively conventional structure, and in particular of the structure described in above-mentioned U.S. Pat. No. 5,317,609, and they are designed so as to be easily replaceable depending on the nature of the assembly to be built up, for example by fixing them using eccentric clamping means.

The frame 64 is typically rigidly secured to the ground. It is generally built as an all-welded structure. The beam 66 pivots relative to the frame 64 about a horizontal axis 78. To minimize its weight, the beam is advantageously constituted by an all-welded structure or a one-piece machined element whose configuration equalizes stresses and which can be designed by the finite element computation technique. An actuator 80, e.g. an electrical actuator, serves to move the beam 66 from the horizontal position in which it is shown in continuous lines in FIG. 7 to the vertical position shown in chain-dotted lines. When the actuator is extended and the beam is in the horizontal position, the end of the beam rests on a support 82 which is generally fixed to the ground. When the beam is in its vertical position, it enables a winch (not shown) to take hold of the top nozzle of the assembly and move it with minimum stress.

To provide biological protection for operators who need to penetrate temporarily into the enclosure, the upending bench 22 is provided with a biological protection hood 24. In order to facilitate handling and upending of the beam, the hood is made up of a plurality of parts capable of sliding relative to one another between the position shown in FIG. 8 where they are placed side by side, and a position in which they overlap. In the embodiment of FIGS. 8 and 9, the hood is made up of a bottom inner part 84, a top inner part 86, and a middle outer part 90. Each of the inner parts carries a closure hatch 92 suspended from a linkage 94 that can be moved vertically by motors 96. These parts can be provided with wheels 98 resting on rails placed on the ground. The component parts of the protection hood can be provided with rings enabling them to be lifted by an overhead crane.

The reception magazine 16 can also be covered by a biological protection hood 100 (FIG. 8) that can be closed by means of a hatch 102.

The insert magazine 74 (FIG. 10) is similar in structure to that described in document U.S. Pat. No. 5,317,609. However a special type of magazine is provided for each type of assembly to be loaded. It comprises a receptacle 110 having an end wall pierced by passages distributed in the same array as the rods to be loaded and intended for receiving inserts. To enable rapid disassembly, the receptacle 110 can have a stand 111 which engages in a socket fixed to the upending beam 66 by screws. A centering pin 112 fixed to the beam engages in a housing of the receptacle to guarantee accurate assembly, and a pressure screw 112 retains the receptacle.

The receptacle 110 and a slideway (not shown) parallel thereto hold a perforated closure plate 114 captive which can be moved by a pneumatic actuator 116 between a position in which it closes the passage and a position in which it opens them.

The insert magazine interposed between the pulling bench and the skeleton structure serves to engage inserts on the bars which guide them through the grids of the skeleton structure. The inserts are retained in the magazine by the closure plate while the inserts are being put into place on the pull bars. In one position of the plate, the inserts are locked, and in the other position, the pull bars fitted with the inserts can move freely through the magazine.

Clamping Skeleton Structures to the Rocking Bench (FIGS. 11 and 12)

To make it possible to switch quickly from loading one type of assembly to another, the upending bench is designed so that different clamping means can be installed and removed quickly. These clamping means hold the skeleton structure in a precise position.

FIG. 12 shows one of the clamps 118, out of eight, for example, for locking a PWR assembly skeleton by clamping on its grids simultaneously. The moving elements of the clamps are shown in continuous lines in the positions they occupy when the clamp is closed, and in chain-dotted lines in the positions they occupy when the clamp is open.

The clamp can be regarded as comprising a clamp pad 120 fitted with means for installing it quickly on the rocking beam, e.g. constituted by bars 122 engaging beneath a soleplate of the beam and clampable by means of screws. One of the flanks of the pad carries an actuator 124 which actuates a lateral shoe 126 for pressing the grid against the other flank of the pad. The other flank carries a pin 128 on which a lid 130 pivots between a closed position and an open position in which the lid extends the arm of the pad upwards. In this position, a skeleton can be inserted into the pad. Another actuator 134 carried by the lid 130 enables the grid to be pressed down against the bottom of the pad and enables it to be centered exactly in the vertical direction, with horizontal direction centering being performed by the actuator 124.

The means for clamping a boiling water reactor assembly skeleton structure can have the structure shown in FIG. 11.

To enable each clamp to be placed at a suitable location for assembly, the clamp is mounted on a lockable slide 135 mounted on a slideway 136 which is rigidly mounted on the upending beam. The slide is lockable by means of an eccentric. The clamp can be regarded as having a clamp pad on which two arms 138 and 140 are hinged. A double-acting pneumatic actuator 142 enables the two arms to be pivoted between a position in which they hold the skeleton structure captive and a position (shown in chain-dotted lines in FIG. 11) in which they release it. The arm 138 constitutes one of the side walls of a reception space. The arm 140 constitutes the other side wall and the lid. Each of the arms has shoes, similar to the shoe 126 shown in FIG. 12, serving to lock the skeleton structure in place.

Each pivoting arm of each clamp can be provided with means for locking it in closed position, actuated by pneumatic actuators. Sensors make it possible to determine whether or not the clamp is closed. Pins can be provided on the clamp for retaining the skeleton structure in the axial position.

Although the actuators of all the clamps can be controlled from a single pneumatic distributor in the example shown in FIG. 12, it is usually necessary for the example shown in FIG. 11 to provide an individual distributor for each clamp.

To enable the actuators to be powered electrically and/or pneumatically and to enable the signals delivered by the sensors responsive to the condition of the clamp to be transmitted, the clamp is generally provided with a length of cable terminated by a connector for connection with a general feed cable placed under the beam. The frame 36 can also have a cable path followed by electrical and/or pneumatic connections between the solenoid valves and actuators for moving the pulling or pushing elements, and by a bus line for transferring electrical signals.

Further clamps other than those shown in FIGS. 11 and 12 can be provided for assemblies of any other kind, and in particular for assemblies of hexagonal section.

The pulling bench 26 can be provided with removable safety arms 42 to ensure that while rods are being pulled they are not pulled too far. FIG. 13 shows two removable arms 42 mounted on the cover block 40. These arms can be placed either in a horizontal working position (in continuous lines in FIG. 13) or in a vertical retracted position. The removable arms carry a photoelectric detector 144 placed on the path of the pulling elements and the rods at a location that is intermediate between the insert magazine 74 and the skeleton structure. During the pulling cycle, the arms are placed in the horizontal position and provide an alarm signal if a rod reaches the line of site of the photoelectric detector during a pulling operation.

What is claimed is:

1. An installation for loading nuclear fuel assemblies each comprising a skeleton structure defining parallel locations for receiving fuel rods distributed in sheets in a predetermined distribution, said installation comprising:

a rigid skeleton-receiving structure for receiving a skeleton structure in horizontal position;

a rod-receiving magazine sized for receiving fuel rods for loading in a disposition that corresponds to the predetermined disposition of said fuel rods in a particular one of said fuel assemblies; and a fuel rod pulling or pushing bench comprising a set of pulling or pushing elements for sliding a plurality of said fuel rods simultaneously from the magazine into the skeleton structure;

wherein said skeleton structure-receiving structure comprises a bench arranged for enabling to securely receive a set of clamps taken from a plurality of sets each corresponding to a particular size of nuclear fuel assembly to be removably fixed by quick coupling and uncoupling means provided with closing and unclosing actuators and said pulling or pushing bench is arranged to receive a block for selecting pulling or pushing elements selected from a plurality of blocks, each block having a disposition of pulling or pushing elements rendered active which corresponds to a particular distribution of said fuel rods in the fuel assembly.

2. An installation according to claim 1 for a fuel assembly whose skeleton structure is constituted by a skeleton having tubes interconnecting support grids, wherein each of said clamps has at least two portions, at least one of said portions being controllable by an actuator for locking respective one of said grids against the structure, said actuators being operable all simultaneously.

3. An installation according to claim 1, wherein said clamps are operable independently of one another, and carry shoes for locking the grids of a skeleton structure in position.

4. An installation according to claim 1, wherein the rod receiving magazine is carried by a support carriage and covered by a biological protection hood having a U-shaped cross-section bearing against the top face of the carriage.

5. An installation according to claim 1, wherein the rigid structure for receiving the assembly skeleton structure is arranged to receive a biological protection hood comprising a plurality of parts which are telescopically movable relative to one another between a disposition in which they are placed side by side and cover the skeleton structure in its entirety, and a concentric disposition in which said parts are located within a reduced longitudinal space.

6. An installation according to claim 1, wherein the rigid structure for receiving an assembly is fixed to a one-piece beam having a cross-section that tapers from the location of an axis for rocking the beam between a horizontal position and a vertical position.

7. An installation according to claim 1, wherein each of said pulling or pushing elements is a pull or push bar provided with a longitudinal displacement actuator and with a force sensor.

8. An installation according to claim 1, further comprising longitudinal slideways provided on the rigid skeleton receiving structure for fixing clamp supports in adjustable positions.

9. An installation according to claim 1, wherein each of said clamps is provided with actuator driven shoe means for clamping a respective grid of a skeleton structure.

10. An installation according to claim 1, wherein the pulling or pushing bench is designed to receive at will any one of a plurality of sets of elements for selecting pulling or pushing elements, each set comprising:

a pulling block provided with actuators and sensors equal in number to a number of recesses for receiving rods in a sheet for the assembly to be loaded, said block being provided with flexible cable means having a terminal connector for making electrical and pneumatic connections and containing all of the conductors associated with the actuators and the sensors;

a set of tubular guides for mounting on the bench; and a selection block placed on the bench facing the support structure and having holes reproducing the array of recesses for receiving rods in the skeleton structure to be loaded.

11. An installation according to claim 1, wherein said rod receiving magazine comprises a housing fitted with means for receiving any one of a plurality of sets of guide plates, each set corresponding to a particular array which is identical to an array of fuel rods in the fuel assembly to be built up.

12. The installation according to claim 1, wherein said pulling or pushing bench is configured with removable safety arms configured to ensure rod position through a photoelectric detector.

* * * * *